Feb. 10, 1970   E. F. FINKIN   3,494,452
MULTIPLE DISC POWER TRANSMISSION
Filed July 28, 1967   5 Sheets-Sheet 1

INVENTOR
EUGENE F. FINKIN
BY
Nilsson Robbins
+ Anderson   ATTORNEYS

Feb. 10, 1970  E. F. FINKIN  3,494,452

MULTIPLE DISC POWER TRANSMISSION

Filed July 28, 1967  5 Sheets-Sheet 2

INVENTOR
EUGENE F. FINKIN
BY
Nilsson, Robbins
& Anderson ATTORNEYS

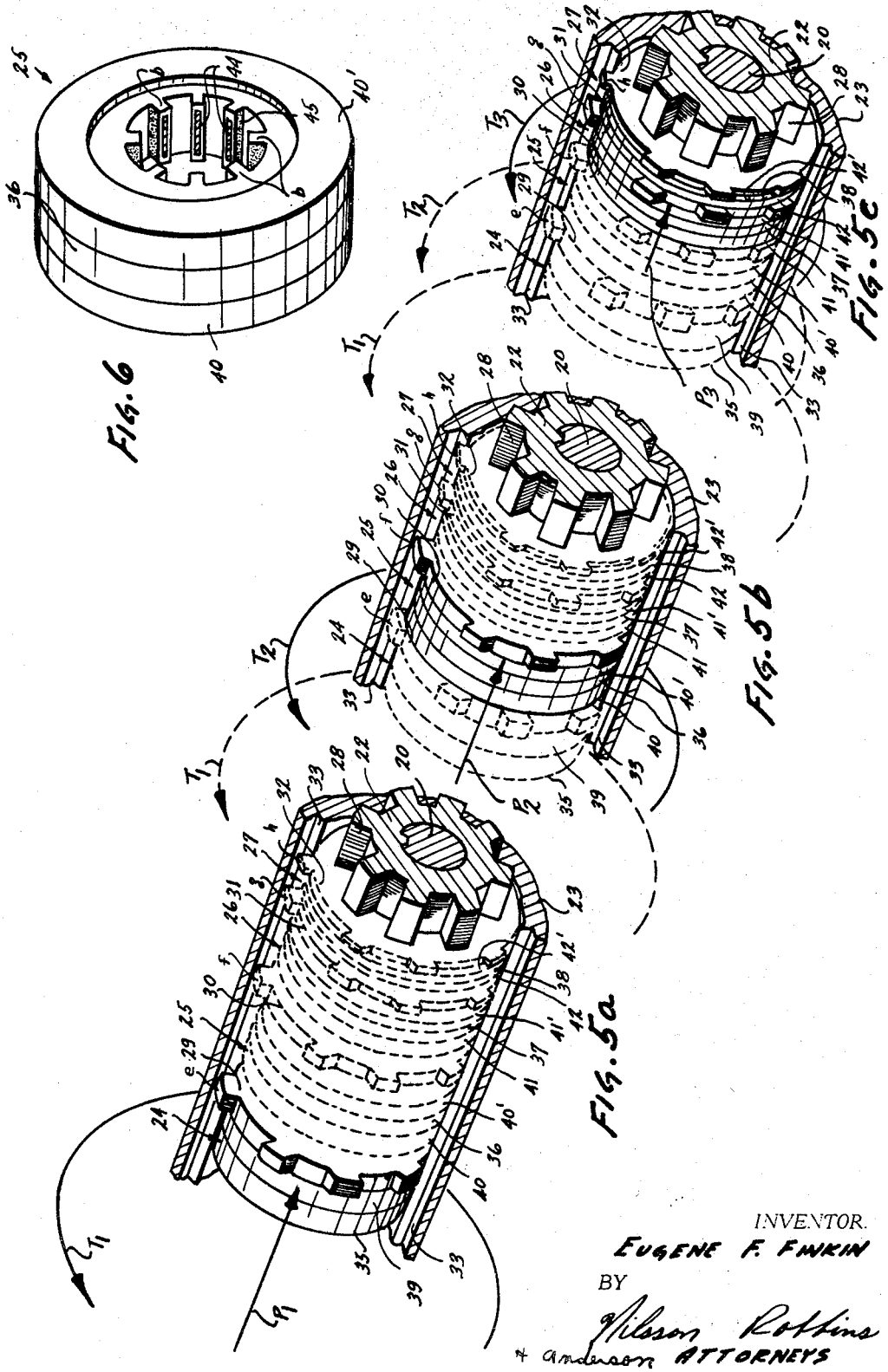

INVENTOR
EUGENE F. FINKIN
BY
Nilsson, Robbins
& Anderson ATTORNEYS

Feb. 10, 1970          E. F. FINKIN          3,494,452
MULTIPLE DISC POWER TRANSMISSION
Filed July 28, 1967                    5 Sheets-Sheet 5

INVENTOR
EUGENE F. FINKIN
BY
Wilson Robbins
+ Anderson
ATTORNEYS

United States Patent Office 3,494,452
Patented Feb. 10, 1970

3,494,452
MULTIPLE DISC POWER TRANSMISSION
Eugene F. Finkin, 817 2nd St., Apt. 106,
Santa Monica, Calif. 90403
Filed July 28, 1967, Ser. No. 656,719
Int. Cl. F16d *13/52, 55/00, 13/60*
U.S. Cl. 192—70.14      11 Claims

ABSTRACT OF THE DISCLOSURE

A friction type power transmission assembly having alternately stacked annular friction pads and plates, keyed by teeth to the splines of telescoped rotary supports for axial displacement thereon and torque transmission therebetween when an axial close-up compression load is applied to an end pad of the assembly. Performance and wear characteristics are substantially improved by: progressively decreasing the axial thickness of the pad and plate teeth and of the pad facings in sequence in accordance with spline friction on axial load transmission from disc to disc as the distance of each disc from the load end of the assembly increases; facing, plating or coating the coengaging surfaces of the teeth and splines with a friction reducing material; recessing pad facings by reducing axial thickness dimension of the core beneath the facing material; varying the effective frictional moment arm of pad facings to control torque transmission distribution through the assembly; and constructing pad and disc teeth with low density filler material while using high density material on the surface to resist stress and wear.

BACKGROUND AND SUMMARY OF THE INVENTION

This invention relates to power transfer devices employing frictional engagement of rotary elements and, more particularly, to a multiple disc compression type friction clutch assembly.

A conventional multiple disc clutch assembly includes annular rotor discs internally keyed by peripherally extending teeth to a splined shaft (over which they may be axially placed) and annular stator discs externally keyed to a splined drum or housing which telescopes over the shaft. In usual practice, the rotor discs provide the power input and the stator discs the power output. The stator discs employed in friction clutches are usually steel plates while the rotor discs are of a steel core construction faced on both sides with a layer of polymeric or sintered material to provide the desired co-efficient of friction between alternately placed rotor and stator discs. For the sake of brevity and in order to more readily distinguish hereinafter between the different discs, those discs which are faced with friction material are called pads, and those which do not have such facings and are positioned intermediate the pads are simply called plates.

For certain installations, it is desirable that both the stator and rotor discs be faced with friction material. In such cases only one face of each disc has such coating and the friction elements are so stacked that the coated surface of each disc faces the uncoated surface of an adjacent disc.

It is to be noted also that while the principles of the invention are described and illustrated in connection with a clutch assembly, they are applicable to brakes as well, the difference being simply that in a clutch both supports of the friction elements are rotatable whereas in a brake one of the supports is fixed.

Prior art multiple-disc clutch assemblies have been characterized by pads and plates of uniform size. Each pad in a particular prior art assembly had the same core and facing thickness as every other pad and the same was true for the thickness of the alternately stacked plates. Typically, the thickness of pad cores and plates have been equal to that of their respective teeth which dimension was determined from an analysis of the combined stress acting on the teeth when under the axial compression load as applied. The overall thickness of each of the pads in a prior art clutch was, therefore, the same as every other pad and was equal to the axial dimension of the pad teeth plus twice the thickness of the pad facing for double-faced pads.

In accordance with the instant invention, the pads and plates of a multiple disc clutch assembly are of non-uniform construction, the structure of a pad or plate being determined by its relative position in the assembly with respect to the application end of the axial close-up load. More specificaly, the thicknesses of the pad and plate teeth and of the pad facings decrease as their distance from the axial load-application end of the pack increase and the thickness of the core beneath the facing material of each pad is decreased still further by the minimum facing thickness required for bonding without mechanical failure. The variation in thickness of the various elements of the pads and plates is determined from an analysis of the adverse effect of spline friction on the transmission of axial compression load from disc to disc through the assembly.

A disc clutch assembly embodying the foregoing features of the invention has significant benefits and advantages both in operation and in wear over prior art disc clutches. Without reducing the life of a clutch assembly hereof, close-up can be effected more smoothly and rapidly with consequently faster and more efficient pick-up and power transmission, due to the fact that the size and mass of each disc is reduced. In fact, the reduction in mass permits a reduction in the applied axial load required for close-up with a consequent reduction in depth rate of wear of pad facings and hence, increases the life of the assembly. The reduction in size of certain pads and plates also permits the overall size of the clutch assembly to be reduced. This may be particularly important where small instrument clutches are desired or for special applications such as in space vehicles.

In conjunction with the foregoing, the peripherally extending teeth of both pads and plates are, in accordance with principles of the invention, either of a hollow construction or are filled with a relatively low density material and are faced, plated or coated with a friction reducing material on those surfaces which engage the splines of the rotary supports. Alternative embodiments can have the splines themselves or both splines and teeth coated with a friction reducing material.

With such a construction, the weight of the pads and plates are reduced still further thus enhancing and increasing the benefits and advantages derived therefrom as indicated above and without adversely affecting the ability of the teeth to withstand stress. More importantly, the friction reducing coatings on the co-engaging surfaces of the teeth and splines produce a reduction in tooth stress which has a direct relation to the coefficient of spline friction thereby permitting the pads and plates to have thinner teeth. Moreover a reduction of the load loss through the pack causes the discs at the distal end of the assembly to develop greater torque, which in some instances permits employment of fewer discs than in prior art structures to produce the same torque transmission.

BRIEF DESCRIPTION OF THE DRAWINGS

The foregoing and other features, benefits and advantages of the invention will be apparent from the detailed description which follows when taken in conjunction with the accompanying drawings forming a part of the specification wherein:

FIGURES 5a, 5b, and 5c are perspective views with portions broken away and in section of the clutch assembly as depicted in FIGURES 2, 3 and 4, respectively, diagrammatically illustrating the manner in which the axial force and torque decreases toward the distal end of the assembly;

FIGURE 6 is a perspective view of a pad embodying improvements of the instant invention;

Figure 1:
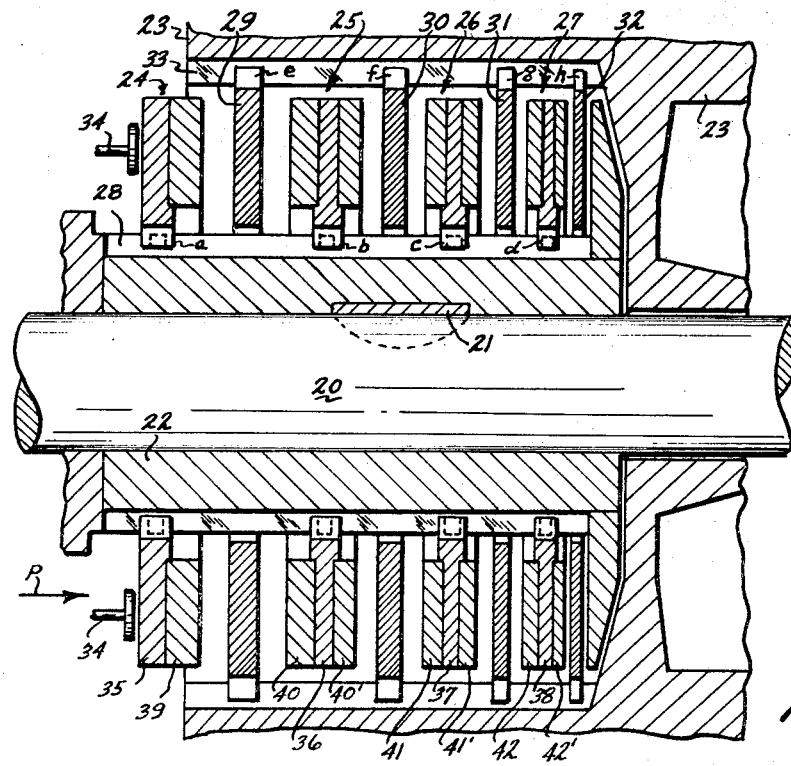
FIGURE 1 is a fragmentary vertical sectional view taken centrally through a clutch assembly embodying an improved construction in accordance with principles of the invention wherein the discs and pads are shown disengaged prior to the application of an axial close-up force.

It is to be understood that certain of the parts depicted in the drawings are somewhat exaggerated in dimension relative to the others in order to better illustrate the principles of the invention.

DETAILED DESCRIPTION OF INVENTION

Turning now to the accompanying drawings and referring specifically to FIGURES 1-4, a friction clutch embodying the several features of the invention is illustrated in various stages of a close-up operation. The clutch includes, conventionally, a rotatable input shaft 20, fixed by a key 21 to a splined hub 22, and to a splined rotatable housing or drum 23 that is telescoped over shaft 20 and hub 22. A series of annular pads 24, 25, 26 and 27 are mounted on the splines 28 of hub 22 by means of their respective teeth $a$, $b$, $c$ and $d$ extending from their inner peripheries. A second series of annular plates 29, 30, 31 and 32 sequentially interposed between consecutive pads are mounted on the splines 33 of drum 23 by means of their respective teeth $e$, $f$, $g$, and $h$ extending from the outer peripheries thereof. It is to be understood that the number of pads and plates shown herein is purely illustrative. In practice, an assembly might have a greater or lesser number of discs.

As a result of the intermeshing relationship between the teeth and the splines, the pads and plates are adapted to slide axially along their respective rotatable support members and during engagement of the clutch to engage one another frictionally for development of torque. A load application device 34 is provided for bringing about this close-up and for maintaining pads and plates in contact during clutch engagement. The particular actuating means for effecting compressive contact is not shown since it has no relation to the invention. In practice, hydraulic, pneumatic, magnetic and/or mechanical means can be employed for this purpose. The device 34 applies an axial load $p$ as represented by the arrow to the end pad 24 in the assembly which load is transmitted from disc to disc through the assembly with diminishing force as explained below as contact is made with succeeding pads and plates.

Each of pads 24–27 has a hard metal body or core 35–38, respectively, and a layer of friction material bonded to at least one side of the core to provide the desired coefficient of friction for effective development of torque between pads and plates. Pad 24 is the end pad in the assembly and is therefore of the single-faced type being provided with a friction material facing 39 on only the internal side of its core 35 which engages the adjacent plate 29. Each of the other pads 25–27, being disposed between two plate members for engagement therewith, has two layers of friction material 40, 40′, 41, 41′, and 42, 42′, respectively.

The pad teeth, which key the pads to the splines 28 of hub 22, are essentially integral extensions of the pad cores. In the conventional friction disc clutch assembly, the axial thickness dimension of the core of each of the pads is the same as the axial dimension of the teeth, which dimension is determined from the combined stress acting on the teeth during clutch engagement. As is clearly shown in FIGURES 10 and 11, the core of each of the pads is, in accordance with the invention, recessed from the teeth so that the friction material of each pad is, in effect, inset into the pad body resulting in a reduction of the overall axial dimension of the pads. The amount that the facings of friction material are to be inset is determined by the minimum permissible thickness of facing material required for bonding without mechanical failure and preferably, is equal to such minimum thickness. This minimum permissible dimension will vary with the type of friction material employed. Where copper-based sintered materials are employed, they are usually bonded to a copper-plated steel core. When the facing material wears down to a thickness within the range of .005–.004 inch, the facing fails by peeling from the electro-plated copper layer of the steel core. Iron-based sintered friction materials are also bonded to a copper-plated steel core but the temperature during bonding is high enough for the copper layer to diffuse both into the steel and the facing. When the thickness of the facing plus the copper infiltrated steel zone is about .005 inch, peeling of the facing material occurs. However, since the copper infiltrated zone is approximately .002 inch thick, failure will occur between .003–.002 inch above the original interface. Consequently where copper-based sintered materials are employed the facing may be inset into the core .004–.005 inch, and where iron-based sintered materials are employed, insetting may be .002– .003 inch.

With the employment of this feature of the invention, the wear life of the pads is not adversely affected since the pad facings in the conventional clutch assembly normally fail, in any event, when their thickness wear down to .004–.005 inch for copper-based materials and .002– .003 for iron-based materials.

It is to be understood that only the surfaces of the core of each of the pads is recessed so that this feature of the invention does not affect the thickness of the teeth. Thus, not only is the size and weight of the assembly reduced without loss of wear life, but such reduction is achieved without sacrificing tooth strength.

As mentioned above, the relative dimensions of certain components of the pads have been exaggerated for the purpose of better illustrating the invention. In actual practice, taking a bulldozer automatic transmission clutch as an example, core thicknesses of pads may be on the order of ⅛ inch whereas the facing thickness may be on the order of .060 inch, depending, of course, upon the power transmission requirements. The pad facing material has a coating thickness less than the thickness of the core (as a matter of fact, often only a small fraction thereof). Despite these relatively small dimensions of thickness, considerable reduction can be achieved. For a double-faced pad employing a copper-based friction material, the total reduction in thickness of the pad will approximate .01 inch. In a multiple-disc clutch having, for example, a dozen pads, this would mean a reduction in the overall size of the assembly of about ⅛ inch.

As noted above, the axial or thickness dimension of the teeth of the pads and plates is determined by the stresses acting on the teeth during clutch engagement. It has been found that the teeth of the pads and plates can, in accordance with the principles of the invention, be constructed with a lower density filler material in order to further reduce the weight of the discs also without significant adverse affects to their ability to withstand stress. An analysis of the combined stresses on the teeth shows that most of the stress is carried at the outside of each tooth body. This means that a large part of the tooth body functions merely as a spacer.

Figure 12:
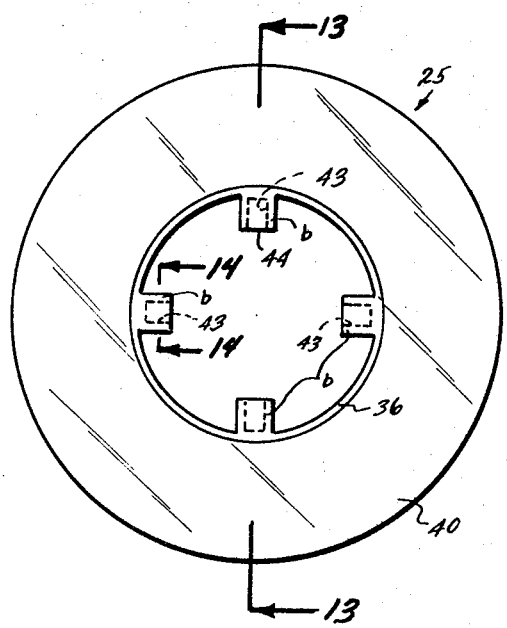
FIGURE 12 is an elevational view of a pad having a low density filler material for the pad teeth in accordance with the instant invention.
Figures 13, 14:
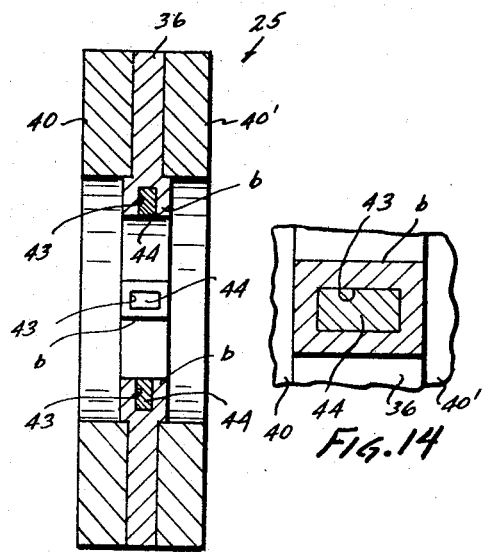
FIGURE 13 is a sectional view of the pad of FIGURE 12 taken on line 13—13.
FIGURE 14 is an enlarged fragmentary sectional view taken transversely of one tooth of the pad of FIGURE 12.

FIGURES 12, 13 and 14 show in greater detail the construction of the teeth b of a typical pad 25 embodying this feature of the invention. Each of the teeth b is constructed with a cavity 43 indicated by the broken lines in FIGURE 12. Cavity 43 is, in the illustrative embodiment, filled with a relatively low density material 44. For filler materials of low density, polyurethane or polytetrafluoroethylene may be employed. It has been found, in fact, that in some applications the teeth may be left hollow (leaving air as the low-density filler) without occurrence of tooth fracture under normal load conditions. In an alternative embodiment of this feature of the invention the entire disc body including the teeth is constructed of a low density coherent filler material in a sandwich structure.

The stresses that the teeth of the pads and plates are subjected to are directly related to spline friction and to the compression load acting on the teeth. This compression load acting on the teeth. This compression load also has a direct effect on the depth rate of wear of the pad facings and hence on the wear life of the pads in the assembly and is also directly related to the torque developed at each pad and plate interface.

It is often erroneously assumed that all discs in an assembly, i.e., pads and plates, have the same compression load acting on them which is taken to be the axial load P applied to the end pad 24 of the assembly. In face, the friction forces between the splines and teeth cause a continuous drop in compression load to occur from the first to the last disc in the assembly. In other words, part of the axial force P which brings the pads and plates into torque transmitting engagement is resisted by the drag force between the teeth of the discs and the corresponding splines of the supports thereof as these elements are moved into engagement while under a torsional load. The result of this drag force is that all of the pad and plate interfaces do not develop the same amount of torque and do not wear away at the same rate. In accordance with the instant invention, the frictional drag force between the teeth and splines can be reduced and controlled by providing a friction reducing material on the coengaging surfaces of the teeth and splines. This can be accomplished by applying a thin layer of bearing metal such as babbitt, porous bronze, etc. or by bonding or applying a layer of solid lubricant such as graphite or molybdenum disulfide to the appropriate surfaces of the teeth. Another way of achieving the desired control of spline friction in accordance with the invention is by making the surfaces of the teeth of a metallic-solid lubricant composite such as bronze-polytetrafluoroethylene or iron-molybdenum disulfide. Similar results can be obtained by applying similar lubricating materials to the splines of the hub and drum themselves. This feature of the invention is clearly illustrated by FIGURES 7a, 7b, 7c, 8 and 9.

Figures 7A, 7B, 7C:
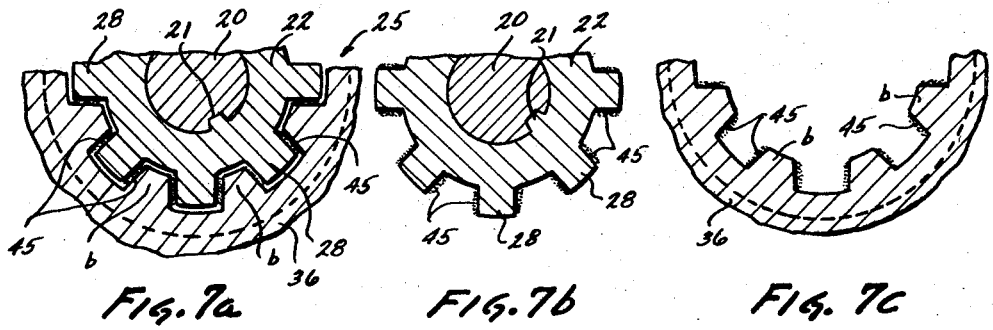
FIGURES 7a, 7b and 7c are fragmentary views in sectional elevation of a pad and splined shaft illustrating alternate structures for achieving a reduction of spline friction in accordance with the principles of the invention.

FIGURES 7a, 7b and 7c are sectional views of a typical pad 25 in the assembly and the associated hub 22 and sub splines 28. The speckled areas 45 of the teeth b and splines 28 is the lubricating coating. FIGURE 7b shows the lubricating coating 45 applied to the splines 28; and FIGURE 7c shows coating 45 applied to the pad teeth b. It is to be noted that the lubricating coating 45 is applied only to those surfaces of the teeth and/or splines which slide against one another while simultaneously being forced against one another during the transmission of torque.

Figure 8:
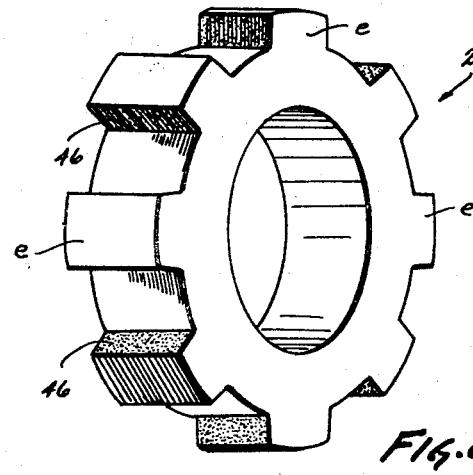
FIGURE 8 is a view in perspective of a typical plate member coated with a spline friction reducing material in accordance with the invention.
Figure 9:
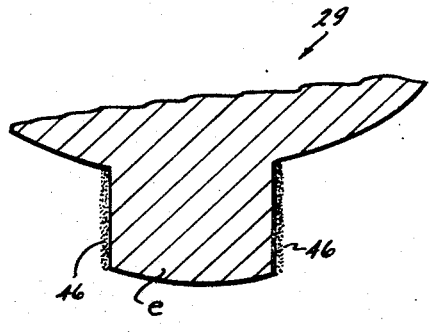
FIGURE 9 is an enlarged fragmentary sectional view of the plate of FIGURE 8 illustrating one of its coated teeth.

FIGURES 8 and 9 show a typical plate 29 embodying this feature of the invention. Again, it is to be noted that the lubricating coating 46 represented by the speckled areas is applied only to the side surfaces of the teeth e which are forced to slide against the drum splines 33 while under compression due to the transmission of torque.

In connection with the foregoing features, it is to be carefully noted that neither the pads nor plates are shown to be the same in the axial or thickness dimensions of their components as is the case with the prior art clutch assemblies. Rather, in accordance with the principles of the invention, the thickness dimensions of the components of the pads and plates decrease as their relative positions in the assembly from the load applicator 34 increase. In fact, the friction material facings on opposite sides of the same pad are initially of different thicknesses in accordance with the invention.

Referring specifically to FIGURE 1, it can be seen that the axial dimension or thickness of the core 35 of pad 24 is greater than that of the core 36 of pad 25, the next pad in sequence. The same is true of the thickness of the teeth a of pad 24 as compared to the thickness of the teeth b of pad 25. The thicknesses of the pad cores and teeth continue to decrease in the same manner from pad to pad through the last 27 in the assembly.

The same relationship exists between the thicknesses of the various plates 29–32 in the assembly. The thickness of plate 29 is greater than that of plate 30 and so on through plate 32, the plate in the assembly most distant from load applicator 34.

It is to be understood that while the core of each pad is smaller in its axial thickness dimension than the teeth of the pad in order to permit the insetting of pad facings as explained above, the order of magnitude of the thickness of each pad core is still a function of the thickness required for its teeth in order for them to withstand the stresses to which they are subject during engagement of the clutch. Thus, it should be noted from the drawings that the decrease from pad to pad of the thickness of pad cores is the same as the decrease from pad to pad of the thickness of the pad teeth.

The amount that the pads and plates are decreased in thickness as their sequential position in the assembly from the load applicator 34 increases is determined by the decrease in axial or compression load transmitted from disc to disc which is, in turn, a function of the spline friction developed by each of the discs during clutch engagement.

Also decreased in sequence in accordance with the above criteria are the pad facings. In practice, the thickness of a pad facing is chosen to be equal to the amount of material that will wear away plus whatever minimum is to be inset into the core. Since the depth rate of wear of a pad facing is directly related to the compression under which it is placed during engagement and since the axial compression load decreases from pad and plate interface to interface in a determinable manner, the facings will wear down at determinably different rates. Thus, pad facing 39 of pad 24 is greater in thickness than facing 40 of pad 25. Facing 40, is, in turn, greater in thickness than facing 40′ of the same pad 25, and so on through the assembly, the facing 42′ of pad 27 being the smallest in thickness.

The result of such a construction is that the different pads in an assembly will have substantially uniform wear lives, the end result being a substantial reduction in the size and weight of the individual pads and of the assembly as a whole without a reduction in the wear life of the assembly itself.

It should be apparent with regard to the foregoing the application of a friction reducing material to the disc teeth and/or splines as described above will have a material effect on the variation in the thicknesses of the disc components.

Figure 2:
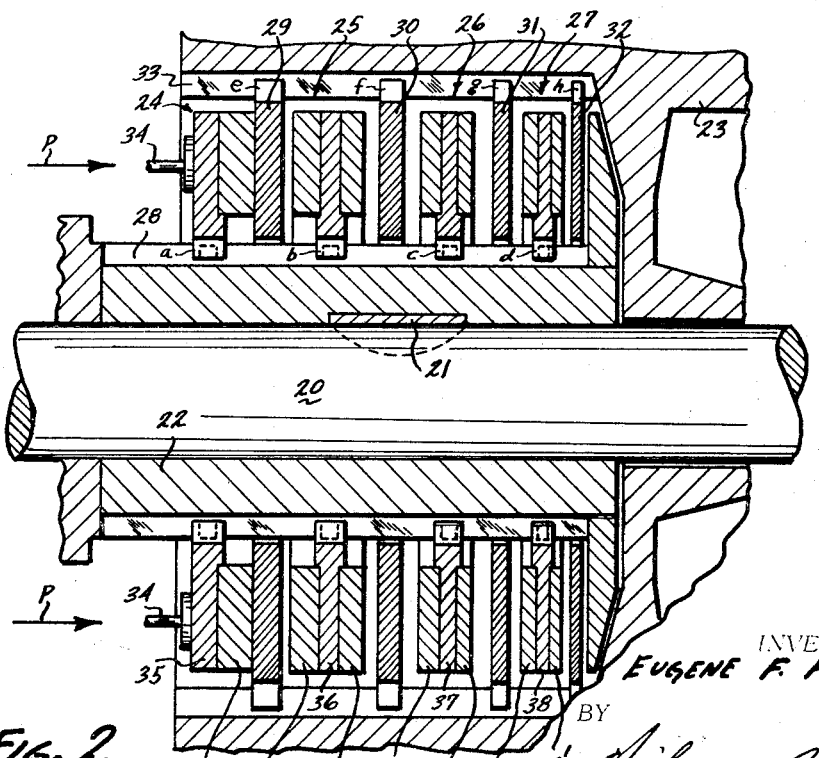
FIGURE 2 is a view similar to FIGURE 1, showing the clutch assembly in the initial stages of close-up just after the application of an axial force.
Figure 3:
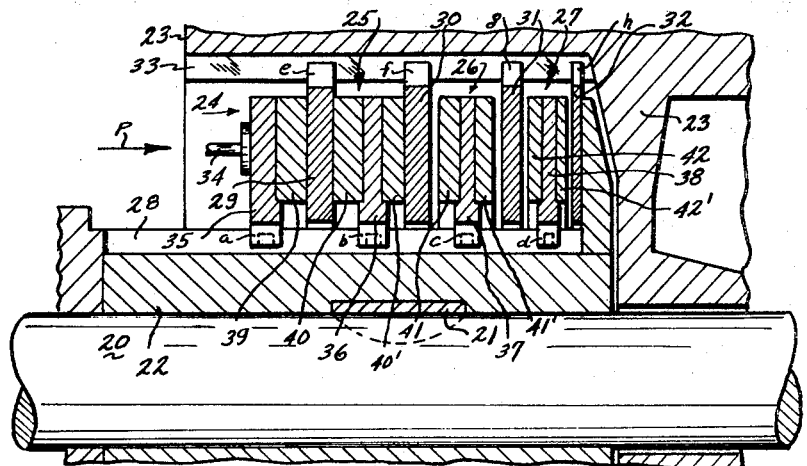
FIGURES 3 and 4 are views similar to FIGURES 1 and 2 showing the assembly in subsequent stages of close-up.
Figure 4:
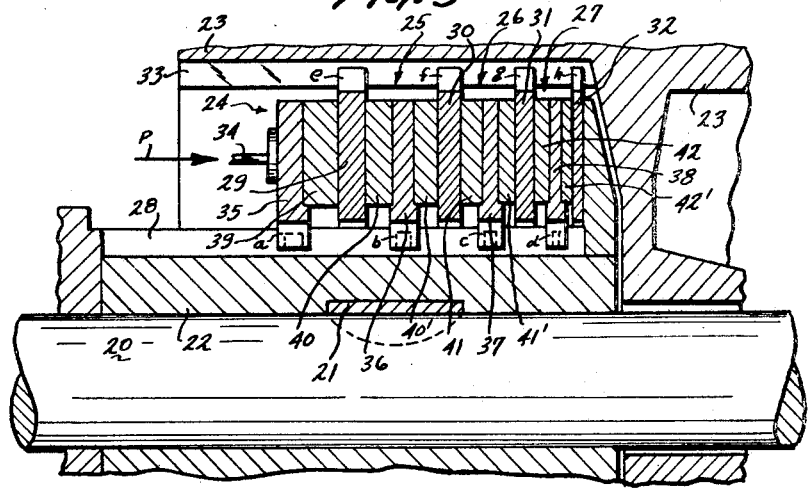

FIGURES 2–4 and 5a–5c show the clutch assembly in various stages of close-up and illustrate by arrows the load transmission and torque distribution through the assembly. FIGURES 2 and 5a show the engagement of pad 24 and plate 29 just after the application of axial loading force P. The force P applied by device 34 to initiate close-up has already been diminished by the friction between teeth $a$ of pad 24 and hub splines 28 so that a force $P_1$ of lesser magnitude than P is acting on pad facing 39. The torque developed at that pad and plate interface is indicated by the arrow $T_1$. FIGURES 3 and 5b shows the assembly at a later stage of close-up. In these figures plate 29 has engaged pad 25 which has, in turn, already engaged plate 30. The arrow $P_2$ indicates the compression force acting and pad facing 40′ of pad 25 which force is reduced still further from $P_1$ by reason of the friction between teeth $b$ of pad 25 and teeth $e$ of plate 29 and their respective splines. The torque developed at the pad 25 and plate 30 interface is represented by the arrow $T_2$ and is of a smaller magnitude than $T_1$. Finally, FIGURES 4 and 5c illustrate the assembly after close-up has been completed and the clutch is fully engaged. The arrow $P_3$ represents the axial compression load acting on the interface of pad 27 and plate 32 and the arrow $T_3$ represents the torque developed at that interface. It is to be understood that $P_3$ represents the smallest magnitude of load acting on any of the pad and plate interfaces in the assembly and that $T_3$, being directly related to $P_3$, is the smallest torque developed at any such interface. However, it is also to be understood that the choice of interfaces chosen for diagrammatic representation in these figures is merely for purposes of illustration and that the load acting on and the torque developed at interfaces intermediate the ones chosen will have intermediate magnitudes.

Figure 11:
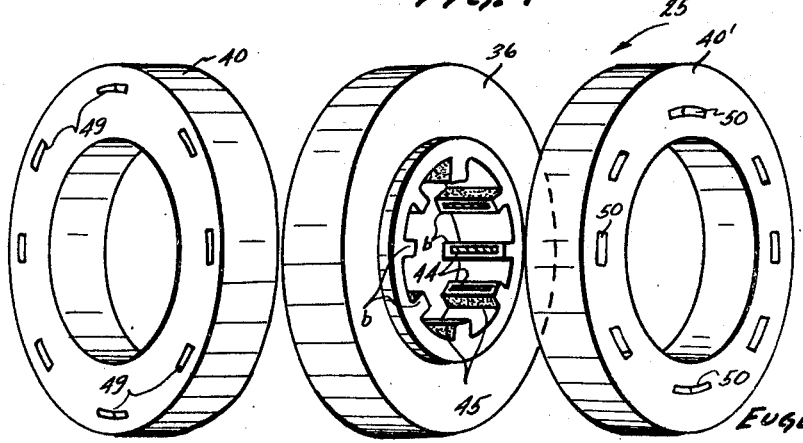
FIGURE 11 is a view similar to FIGURE 10 showing alternative means for controlling the effective frictional moment arms of the pad facings.
Figure 10:
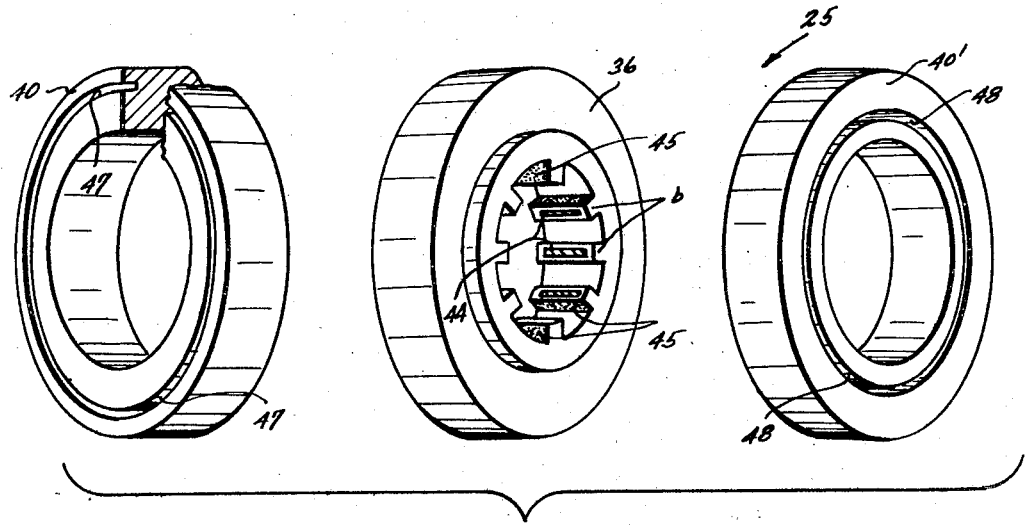
FIGURE 10 is an exploded perspective view partially in section of an improved pad incorporating features of the invention illustrating, specifically, one manner of controlling effective frictional moment arms of the pad facings.

The foregoing discussion was based on the assumption that the amount of torque developed at particular pad and plate interfaces is not important as long as the overall assembly develops a sufficient amount of torque as a unit to provide the power transmission desired. However, it is anticipated that in certain situations it will be desirable to obtain a specific torque distribution among the different interfaces. For example, it may be desirable to have the same amount of torque developed at every pad and plate interface in an assembly or to have a rapidly increasing or decreasing torque distribution characteristics. Two ways of accomplishing the control of torque distribution in a clutch assembly in accordance with the invention are illustrated in FIGURES 10 and 11. Both rely on the principle that the amount of torque developed at a given pad and plate interface can be controlled by controlling the effective frictional moment arm of the pad facing at that interface.

FIGURE 10 is an exploded view of a typical pad 25 the pad facings 40, 40′ being shown to the left and to the right of the core 36 represented at the center. The facing 40, which is greatly enlarged, is formed with a concentric groove 47 near the outer periphery thereof. By providing this groove the surface geometry of the facing layer has been altered so that the frictional engagement of the facing 40 with adjacent plate member 29 will result in an altered frictional moment arm. By varying the width of the groove and/or its distance from the axis of the pad, one can obtain varying frictional moment arms. This is illustrated by facing 40′ which is applied to the right-hand side of the pad core 36 as viewed in FIGURE 10. Facing 40′ is formed with a concentric groove 48 having a width similar to that of groove 47 but which is relatively much closer to the axis of the pad than is groove 47. Due to the change in radius of the grooves of facings 40 and 40′, the torque developed at the two interfaces will be decidedly different. It is to be carefully noted that the variation in frictional moment arm is accomplished with very little reduction in the available surface area of the facings for frictional contact. This is important to the wear life of the assembly because of the fact that the depth rate of wear of a pad facing is inversely proportional to its surface area.

An alternative embodiment of this feature of the invention is shown in FIGURE 11, again in conjunction with pad 25. Instead of forming continuous grooves of the desired width and radius in the pad facings, slots are employed. Thus, facing 40 is provided with a series of slots 49 arranged in concentric fashion near the outer periphery of the facing. Similar slots 50 are similarly arranged in concentric fashion on facing 40′ near the inner periphery thereof. The effect of such a pad construction is again to vary the effective frictional moment arms of the two pad facings without significantly increasing their depth rates of wear.

Figure 15:
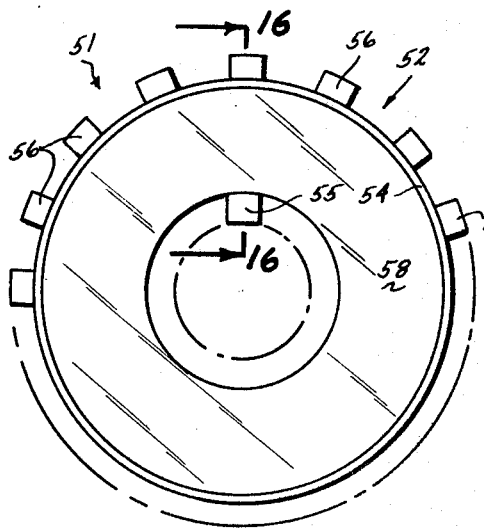
FIGURES 15 and 16 are elevational and fragmentary sectional views, respectively, illustrating a recessed pad facing construction as embodied in a clutch assembly having single-faced pads.
Figure 16:
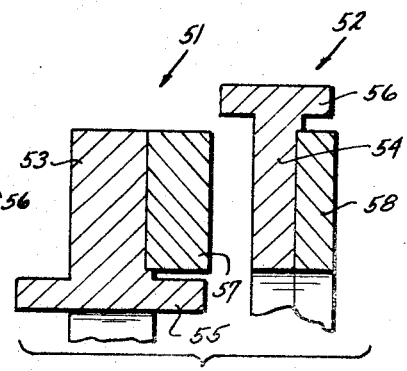

The various features of the invention have so far been illustrated and described in connection with a friction disc interposed between the pads. However, the principles of the invention are just as applicable to clutches of the type having only single-faced pads serving as both stator and rotor discs. Such a construction, embodying several features of the invention, is shown in FIGURES 15 and 16. The front elevational view of FIGURE 15 shows a first single-faced pad 51 behind which are visible the teeth of a second single-faced pad 52. Both of these pads are shown fragmented and in section in FIGURE 16.

As shown in FIGURE 16, each of pads 51, 52 has, respectively, a hard metal core 53, 54, peripherally extending teeth 55, 56 integral with the core, and a facing of friction material 57, 58 on one side of the core. The pads are disposed so that the facing 57 of pad 51 contacts during clutch engagement the exposed side of metallic core 54 of pad 52. The friction material facing 58 of pad 52 will contact, in turn, the exposed side of the metallic core of the next pad in sequence (not shown) and so on through the assembly. Thus, the exposed side of each single-faced pad substitutes for the metallic phase members of the double-faced pad clutch assembly. Apart from this difference in the two types of friction disc clutch assemblies, the two are the same and the wear and performance characteristics are also the same. Hence, FIGURE 10 clearly shows that the facing of each pad is inset into the core, the amount of such insetting being, again, determined by the minimum permissible facing thickness required for bonding without mechanical failure.

Another feature of the invention embodied in the assembly of FIGURES 15 and 16 is the reduction from pad to pad of the thickness of the pad components as their distances from the load end of the assembly increases. Thus, taking the load application end of the assembly to be at the left as viewed in FIGURE 16, the axial or thickness dimensions of core 53, teeth 55 and facing 57 of pad 51 are greater than the thickness dimensions of their counterparts in pad 52.

It is to be understood that the other features of the invention not illustrated in FIGURES 15 and 16 are nevertheless applicable to a single-faced pad assembly of the type shown therein.

What is claimed is:

1. In a friction brake or clutch assembly having a plurality of alternately placed annular plate and pad members slidably mounted on cooperating supports for mating compression of their co-engaging surfaces, means for effecting said compression of said plate and pad members by axial displacement, the components of each of said pad elements comprising, a core teeth extending therefrom and a facing layer of friction material on said core, the improvement comprising a plurality of pad members with cores and facing layers each of which has progressively narrower axial dimensions along said support in the direction of reduced axial force resulting from friction in said means for effecting said compression.

2. A friction assembly in accordance with claim 1 wherein each of said plate members have peripherally extending teeth, said plate members being arranged with teeth having progressively narrower axial dimensions.

3. In a friction brake or clutch assembly having alternately placed annular pad and plate members slidably arranged over telescoping splined supports for compression of their co-engaging surfaces, means at one end of said assembly for effecting said compression, said pad and plate members having peripherally extending tooth components engaging the splines of their respective supports, said pad members each comprising a core and a facing layer of friction material thereon, the improvement which comprises stacking plate members having teeth of progressively narrower axial dimension over one of said supports and pad members having facing layers of progressively narrower thickness over the other of said supports.

4. A friction assembly in accordance with claim 2 wherein said pad facings are inset into said cores.

5. A friction assembly in accordance with claim 3 wherein the thickness of the core of each of said pads is less than the thickness of the teeth thereof, said difference being equal to the minimum thickness of facing material required for bonding without mechanical failure.

6. A friction assembly in accordance with claim 4 wherein said pads have progressively narrower teeth as well as progressively thinner layers of facing material.

7. In a friction brake or clutch assembly having alternately placed annular pad and plate members slidably arranged over telescoping splined supports for compression of their co-engaging surfaces, means at one end of said assembly for effecting said compression, said pad and plate members having peripherally extending teeth engaging the splines of their respective supports said pad members comprising a core and facing layers of friction material applied thereto, the improvement comprising forming concentric grooves in said pad facings in order to control the torque developed at each pad facing.

8. A friction assembly in accordance with claim 7 wherein said grooves in said pad facings are placed at progressively varying radial distances in accordance with the torque distribution characteristics desired.

9. In a friction brake or clutch assembly having a plurality of alternately placed annular pad and plate members slidably arranged over telescoping splined supports for compression of their co-engaging surfaces, means at one end of said assembly for effecting said compression, said pad and plate members having peripherally extending teeth engaging the splines of their respective supports, said pad members comprising a core with facing layers of friction material applied thereto, the improvement comprising facings which define concentrically arranged slots at varying radial distances from the axis of said pads whereby to progressively vary the effective frictional moment arms of said facing layers.

10. A friction assembly according to claim 9 wherein said pad members are of progressively narrow or axial dimension along said support in the direction of reduced axial force resulting from friction in said splined supports.

11. A friction assembly according to claim 9 further including friction reducing material applied to reduce friction between mated surfaces of said teeth and said splines.

References Cited

UNITED STATES PATENTS

| | | | |
|---|---|---|---|
| 1,470,268 | 10/1923 | Lauth | 192—70.14 |
| 2,025,098 | 12/1935 | Dudick | 192—70.2 XR |
| 2,201,339 | 5/1940 | Hunt | 192—52 XR |
| 3,255,846 | 6/1966 | Livezey. | |
| 3,269,489 | 8/1966 | Roth | 188—71 |

FOREIGN PATENTS 1,227,217  3/1960  France.

MARK NEWMAN, Primary Examiner

ALLAN D. HERRMANN, Assistant Examiner

U.S. Cl. X.R.

188—72, 218; 192—70.2, 107